Dec. 16, 1930.   W. J. McLACHLAN   1,785,713
SYSTEM OF ELECTRIC DISTRIBUTION
Filed April 13, 1929
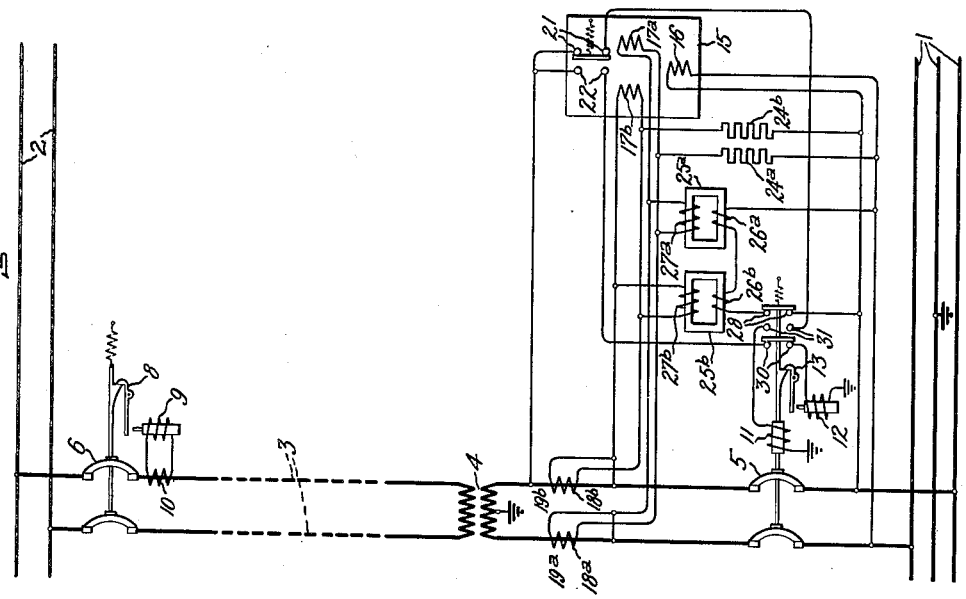
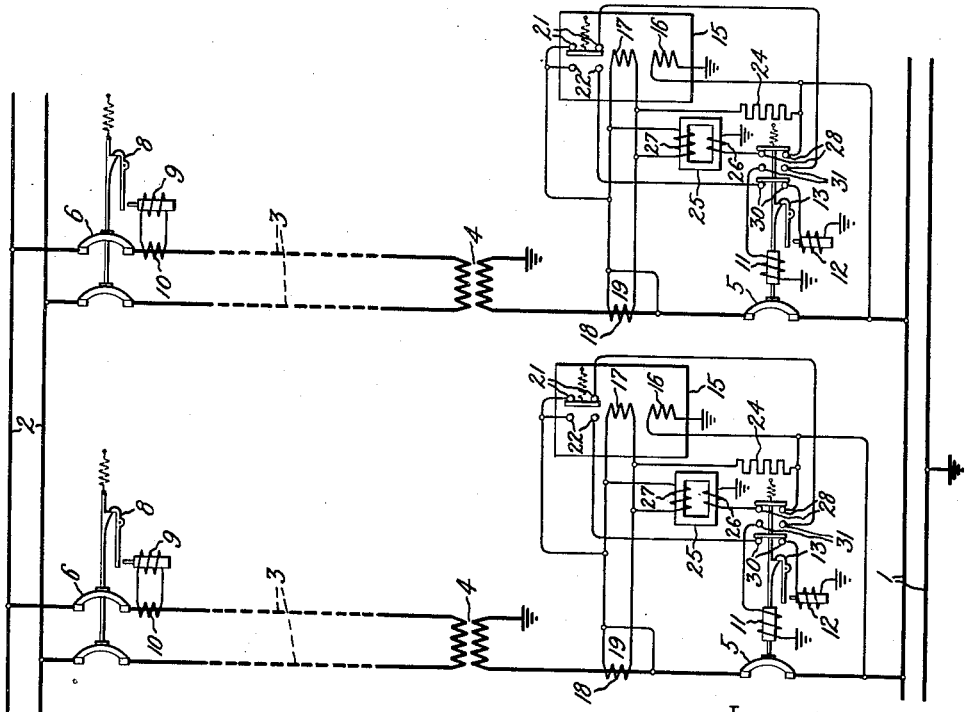
Inventor:
Willard J. McLachlan,
by Charles E. Mullan
His Attorney.

Patented Dec. 16, 1930

1,785,713

UNITED STATES PATENT OFFICE

WILLARD J. McLACHLAN, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed April 13, 1929. Serial No. 354,963.

My invention relates to systems of electric distribution and particularly to alternating current networks which are supplied with current at a plurality of points by means of feeder circuits fed from the same or different sources of current. In such network systems it is desirable to be able to disconnect a feeder from the network whenever a fault occurs on the feeder and to reconnect the feeder to the network automatically when the feeder is reenergized.

For accomplishing this result various arrangements have been proposed for disconnecting a faulty feeder in response to the flow of power from the network to the feeder and for reconnecting the feeder to the network when the feeder voltage is restored to normal. In such arrangements it is desirable in some cases to arrange the control means which responds to the reverse flow of power from the network to the feeder so that the control means does not respond to a relatively small reversal of power. In such cases where a very high reverse power setting is required and the control means is a power directional relay including cooperating voltage and current windings respectively energized from the feeder, the amount of reverse current required to produce sufficient torque to operate the relay under very low voltage conditions is very large so that the relay may not function properly to effect the disconnection of a faulty feeder in the desired manner. One object of my invention is to provide an improved arrangement which may be readily applied to existing arrangements whereby the desired disconnection of a faulty feeder may be effected under such abnormal voltage conditions of the feeder by means of a power directional relay which normally has a high reverse power setting.

My invention will be better understood from the following description when taken in connection with the accompanying drawings and its scope will be pointed out in the appended claims.

Referring to the drawing, Fig. 1 is a diagram of a single-phase system of electric distribution embodying my invention; and Fig. 2 is a modification of the control arrangement shown in Fig. 1.

Referring to Fig. 1, 1 is a single-phase network which is arranged to be supplied with electric energy from a suitable supply circuit 2 by means of a plurality of feeder circuits 3, two of which are shown in the drawing.

Each feeder circuit 3 includes a step-down transformer 4, the low voltage secondary winding of which is arranged to be connected to the network by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit by means of a current transformer 10. Any suitable means, either manually or automatically controlled, may be provided for closing the circuit breaker.

The circuit breakers 5 may also be of any suitable type, examples of which are well known in the art. As shown in the drawing, each circuit breaker 5 is of the well known latched-in type and includes a closing coil 11, which, when energized, closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3, each circuit breaker 5 has associated therewith a power directional relay 15 which is arranged to effect the energization of the trip coil 12 of the circuit breaker when a predetermined amount of reverse power flows from the network to the associated feeder circuit. The power directional relays 15 may be of any suitable type examples of which are known in the art. As shown, each power directional relay 15 includes a potential winding 16 which is permanently connected across the network 1 and a current coil 17 which is permanently connected across the secondary winding 18 of a current transformer 19 the primary winding of which is connected in series relation with the secondary winding of the associated power transformer 4 and the network 1 when the associated circuit breaker 5 is closed. Each power directional relay 15 is arranged so that normally it maintains closed its contacts 21 which are in an energizing circuit for the closing coil 11 of the associated circuit breaker 5. When, however, more than a predetermined amount of reverse power flows from the network 1 to a feeder circuit 3 the associated power directional relay 15 is arranged to open its contacts 21 and closes its contacts 22 which are in an energizing circuit for the trip coil 12 of the associated circuit breaker 5.

In order that each power directional relay 15 may also control the reclosing of the associated secondary circuit breaker 5 the current winding 17 of each power directional relay is also connected directly in a shunt circuit around the terminals of the associated secondary circuit breaker 5 so that when the circuit breaker is open a voltage which depends upon the relative phases and magnitudes of the associated power transformer secondary and the network voltages is impressed across the current winding 17. Preferably a suitable current limiting device, such as a resistor 24 which has a negative temperature coefficient, is connected in series with each winding 17 in the shunt circuit around the terminals of the associated secondary circuit breaker 5.

The arrangement heretofore described for controlling the opening and closing of a secondary circuit breaker is an arrangement old and well known in the art for controlling network circuit breakers.

In order that each power directional relay 15 may operate to effect the opening of its contacts 21 and the closing of its contacts 22 in response to a high value of reverse power under normal voltage conditions in its associated feeder circuit 3 and in response to values of reverse power which vary approximately directly with the transformer secondary voltage as it varies, in accordance with my invention, each relay 15 has associated therewith an auxiliary potential transformer 25, the primary winding 26 of which is connected so as to be energized in response to the secondary voltage of the associated power transformer 4 and the secondary winding 27 of which is connected directly across the terminals of the current coil 17 of the associated power directional relay 15. The circuits of the windings of each potential transformer 25 are arranged in any suitable manner so that the voltage impressed across the current winding 17 of the associated power directional relay by the secondary winding 27 alone causes a current of the proper phase to flow through the current winding 17 to produce in cooperation with its associated voltage winding 16 a torque in a direction to maintain contacts 21 of the relay closed. Therefore, it will be observed that the restraining effect, due to the current produced in the circuit of each winding 17 by the associated potential transformer 25, varies directly with the voltage of the associated feeder circuit so that the amount of reverse power required to operate the relay varies approximately directly with the voltage of the feeder voltage.

The particular advantage in obtaining the high and variable reverse power setting of a power directional relay by means of a separate potential transformer in the manner above described is that my improved arrangement can be added to equipments which are already in service with low reverse power settings without necessitating any change in either the relays or current transformers of the existing equipments.

In order that the restraining effect produced by each transformer 25 may be removed during the reclosing operation of the associated power directional relay 15, I provide each secondary circuit breaker 5 with auxiliary contacts 28 which are connected in the circuit of one of the windings of the associated potential transformer 25. As shown in the drawing, the contacts 28 are connected in the circuit of the primary winding 26 of the associated transformer 25.

The operation of the arrangement shown is as follows: When the circuit breakers 5 and 6 in a feeder are closed and a fault occurs on the feeder, the abnormal current flowing from the supply circuit through the circuit breaker 6 in the faulty feeder to the fault causes the overload trip coil 9 of the circuit breaker 6 to effect the opening thereof.

The reverse current which is fed from the network 1 through the circuit breaker 5 in the faulty feeder to the fault, and which also flows through the primary winding of the current transformer 19 in the faulty feeder causes the phase of the resultant voltage impressed on the current winding 17 of the relay 15 by the secondary windings 18 and 27 to be shifted relative to the current in the relay winding 16 so that a torque is produced by the relay windings 16 and 17 in the proper direction to effect the opening of relay contacts 21 and the closing of the relay contacts 22. The amount of reverse current required to effect this operation will depend upon the voltage impressed upon the winding 26 of the auxiliary transformer 25 since the restraining effect due thereto varies directly with the feeder voltage. Consequently, when the feeder voltage is low, the restraining effect is low and the amount of reverse power required to effect the operation of the power directional relay is less than when the feeder voltage is normal.

When the power directional relay 15 closes its contacts 22, it connects the trip coil 12 and the auxiliary contacts 30 on the circuit breaker 5 in the faulty feeder in series across the secondary of the associated power transformer 4 so that the circuit breaker 5 is opened to disconnect the faulty feeder from the network.

After the circuit breaker 5 opens the associated relay 15 maintains its contacts 21 open until the circuit breaker 5 is closed and a predetermined phase relation exists between the voltages of the secondary of the reenergized transformer 4 and the network so that current of the proper phase flows through the current winding 17 and the resistor 24. When a relay 15 closes its contacts 21, it connects the closing coil 11 and auxiliary contacts 31 on the associated circuit breaker 5 in series across the secondary of the associated transformer 4 so that circuit breaker 5 closes and reconnects the feeder to the network.

The modification shown in Fig. 2, is similar to the control arrangement shown in Fig. 1 for each feeder except that I have shown an arrangement for a double pole secondary circuit breaker 5. In this modification the power directional relay 15 is provided with two current coils 17a and 17b which are respectively connected across the secondary windings 18a and 18b of two current transformers 19a and 19b, the primary windings of which are connected in different conductors of the secondary circuit of the power transformer 4. The current coils 17a and 17b also are respectively connected across the secondary windings 27a and 27b of two auxiliary potential transformers 25a and 25b, the primary windings 26a and 26b of which are arranged to be connected in series across the secondary circuit of the power transformer 4 by auxiliary contacts 28 on the circuit breaker 5 when it is closed. The current winding 17a in series with the resistor 24a and the current winding 17b in series with the resistor 24b are also respectively connected across their respective poles of the associated circuit breakers 5 so that they are energized in response to the difference in phase and magnitude of the voltages across the respective circuit breaker poles when the circuit breaker is open.

Since the modification shown in Fig. 2 is similar to the arrangement shown in Fig. 1 and the operation is also similar, it is believed that a detail description of the operation is unnecessary.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current circuit, a circuit breaker in said circuit, a current transformer having a primary winding energized in response to the current in said circuit, a potential transformer having a primary winding energized in accordance with the voltage of said circuit, and power directional means for controlling the operation of said circuit breaker having a winding simultaneously connected across the secondary windings of said transformers so that the amount of power required to operate said power directional means to effect the operation of said circuit breaker varies substantially directly with the voltage of said circuit.

2. In combination, an alternating current supply circuit, an alternating current load circuit, a circuit breaker interconnecting said circuits, a reverse power relay for controlling the operation of said circuit breaker having an operating winding connected in series relation with said circuits when said circuit breaker is closed, and means for causing the amount of reverse power required to operate said relay to vary directly with the voltage of said circuit including a potential transformer having its secondary winding connected to said operating winding for impressing on said operating winding a voltage which varies with the supply circuit voltage.

3. In combination, an alternating current supply circuit, an alternating current network, a power transformer having its primary winding connected to said circuit and its secondary winding connected to said network, a circuit breaker between said transformer secondary and the network, a power directional relay for controlling the opening of said breaker having a current winding connected in series relation between said transformer secondary and the network when said circuit breaker is closed, a potential transformer having its primary winding connected so as to be energized in accordance with the secondary voltage of said power transformer and a secondary winding connected to said current winding of said relay, and means controlled by said circuit breaker for rendering said potential transformer inoperative to energize said current winding when said circuit breaker is open.

4. In combination, an alternating current supply circuit, an alternating current network, a power transformer having its primary winding connected to said circuit and its secondary winding connected to said network, a circuit breaker between said transformer secondary and the network, a current transformer having its primary winding connected in series relation between said power transformer secondary and the network, an auxiliary potential transformer having its primary winding connected so as to be energized in accordance with the voltage of the power transformer secondary, a power directional relay for controlling the opening of said circuit breaker having a current winding connected across the secondary windings of said current and potential transformers, and means controlled by said circuit breaker for effecting the opening of one of the circuits of said auxiliary potential transformer when said circuit breaker is opened.

5. In combination, an alternating current supply circuit, an alternating current network, a power transformer having its primary winding connected to said circuit and its secondary winding connected to said network, a circuit breaker between said transformer secondary and the network, a current transformer having its primary winding connected in series relation between said power transformer secondary and the network, an auxiliary potential transformer having its primary winding connected so as to be energized in accordance with the voltage of the power transformer secondary, a power directional relay for controlling the opening and closing of said circuit breaker having a current winding connected across the secondary windings of said current and potential transformers and also directly in a circuit between said power transformer secondary and the network when said circuit breaker is open, and contacts in the circuit of one of the windings of said auxiliary potential transformer controlled by said circuit breaker whereby the circuit of said one of said windings is open when said circuit breaker is open.

In witness whereof, I have hereunto set my hand this 12th day of April, 1929.

WILLARD J. McLACHLAN.